US011064657B2

(12) United States Patent
Lang

(10) Patent No.: US 11,064,657 B2
(45) Date of Patent: Jul. 20, 2021

(54) FEED SYSTEM CAP FOR AGRICULTURAL BALER

(71) Applicant: Deere & Company, Moline, IL (US)

(72) Inventor: Eric R. Lang, Newhall, IA (US)

(73) Assignee: DEERE & COMPANY, Moline, IL (US)

( * ) Notice: Subject to any disclaimer, the term of this patent is extended or adjusted under 35 U.S.C. 154(b) by 232 days.

(21) Appl. No.: 15/947,529

(22) Filed: Apr. 6, 2018

(65) Prior Publication Data

US 2019/0307075 A1    Oct. 10, 2019

(51) Int. Cl.
| | | |
|---|---|---|
| *A01F 15/10* | (2006.01) |
| *A01F 15/06* | (2006.01) |
| *A01F 15/18* | (2006.01) |
| *B30B 9/20* | (2006.01) |
| *B30B 9/30* | (2006.01) |
| *A01F 15/04* | (2006.01) |

(52) U.S. Cl.
CPC ............ *A01F 15/101* (2013.01); *A01F 15/04* (2013.01); *A01F 15/06* (2013.01); *A01F 15/18* (2013.01); *B30B 9/20* (2013.01); *B30B 9/301* (2013.01); *A01F 2015/102* (2013.01); *A01F 2015/186* (2013.01)

(58) Field of Classification Search
CPC ........ A01F 15/04; A01F 15/06; A01F 15/101; A01F 2015/102; A01F 2015/105; A01F 2015/186; B30B 9/30; B30B 9/301
USPC ............. 100/240, 245, 216, 215, 179, 188 R
See application file for complete search history.

(56) References Cited

U.S. PATENT DOCUMENTS

| 765,533 A | 7/1904 | White |
| 5,291,825 A | 3/1994 | Dietrich |
| 5,540,143 A | 7/1996 | Stromer et al. |

(Continued)

FOREIGN PATENT DOCUMENTS

| DE | 333419 C | 2/1921 |
| EP | 0333065 A1 | 9/1989 |

(Continued)

OTHER PUBLICATIONS

Beck EP 0333065 Translation, Translated Jan. 14, 2020 (Year: 1989).*

(Continued)

*Primary Examiner* — Debra M Sullivan
*Assistant Examiner* — Matthew Kreese
(74) *Attorney, Agent, or Firm* — Michael Best & Friedrich LLP

(57) ABSTRACT

A baler having a frame, a feed system coupled to the frame, a baling chamber for receiving crop from the feed system, and a plunger assembly reciprocally compressing the crop. The baling chamber defines an extrusion axis therethrough. The plunger assembly is at least partially positioned within and movable with respect to the baling chamber. The plunger assembly has at least a first plunger motion aligned with the extrusion axis. The baler also includes a feed system cap having at least a first cap motion aligned with the extrusion axis, the first cap motion being synchronized with the first plunger motion. At least one of the plunger assembly and the feed system cap has a second motion that is not aligned with the extrusion axis.

13 Claims, 6 Drawing Sheets

(56) References Cited

U.S. PATENT DOCUMENTS 8,069,781 B2 * 12/2011 Lang ................. B30B 9/306
100/189
2018/0098507 A1    4/2018  Kraus
2018/0098508 A1    4/2018  Kraus

FOREIGN PATENT DOCUMENTS

| FR | 592257 A       |   | 7/1925 |           |
|----|----------------|---|--------|-----------|
| GB | 791419 A       | * | 3/1958 | A01F 15/101 |
| WO | 2011053122 A1  |   | 5/2011 |           |

OTHER PUBLICATIONS

John Deere, "New John Deere Large Square Balers," <https://www.youtube.com/watch?v=F1AQ41vpBVA> webpage publically available at least as early as Sep. 16, 2014.

European Search Report issued in counterpart application No. 19166860.7 dated Sep. 27, 2019. (8 pages).

\* cited by examiner

FEED SYSTEM CAP FOR AGRICULTURAL BALER

BACKGROUND

The present disclosure relates to an agricultural baler having a compression system for forming bales of crop.

SUMMARY

Square balers have been used for harvesting crop, such as hay, for many years. Their primary advantage over other types of balers is that they densify the crop into rectangular-shaped bales, which minimizes both shipping and storage costs. Currently, there is a desire to create bales with higher density, which requires higher plunger forces and thus higher loads on the elements of the drive train (i.e., the plunger, gearbox, crank arm, and the like). As such, baler designs are changing to allow for such large plunger forces. As a result of these changes, new challenges arise with respect to guiding crop flow through the machine and maintaining consistent crop density from the top of the bale to the bottom.

In one aspect, the disclosure provides a baler having a frame, a feed system coupled to the frame, a baling chamber for receiving crop from the feed system, and a plunger assembly for compressing the crop. The baling chamber defines an extrusion axis therethrough. The plunger assembly is at least partially positioned within and movable with respect to the baling chamber. The plunger assembly has at least a first plunger motion aligned with the extrusion axis. The baler also includes a feed system cap having at least a first cap motion aligned with the extrusion axis, the first cap motion being synchronized with the first plunger motion. At least one of the plunger assembly and the feed system cap has a second motion that is not aligned with the extrusion axis.

In another aspect, the disclosure provides a baler having a frame, a feed system coupled to the frame, a baling chamber for receiving crop from the feed system, and a plunger assembly for compressing the crop. The baling chamber defines an extrusion axis therethrough. The plunger assembly is at least partially positioned within and movable with respect to the baling chamber. A feed system cap is pivotally coupled to the plunger assembly. The feed system includes an opening to the baling chamber through which the crop passes from the feed system to the baling chamber, and the feed system cap is configured to open and close the opening.

In still another aspect, the disclosure provides a baler having a frame, a feed system coupled to the frame, a baling chamber for receiving crop from the feed system, and a plunger assembly for compressing the crop. The baling chamber defines an extrusion axis therethrough. The plunger assembly is at least partially positioned within and movable with respect to the baling chamber. A feed system cap is pivotally coupled to the plunger assembly. The feed system cap has a roller moveable along a fixed track.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 1:
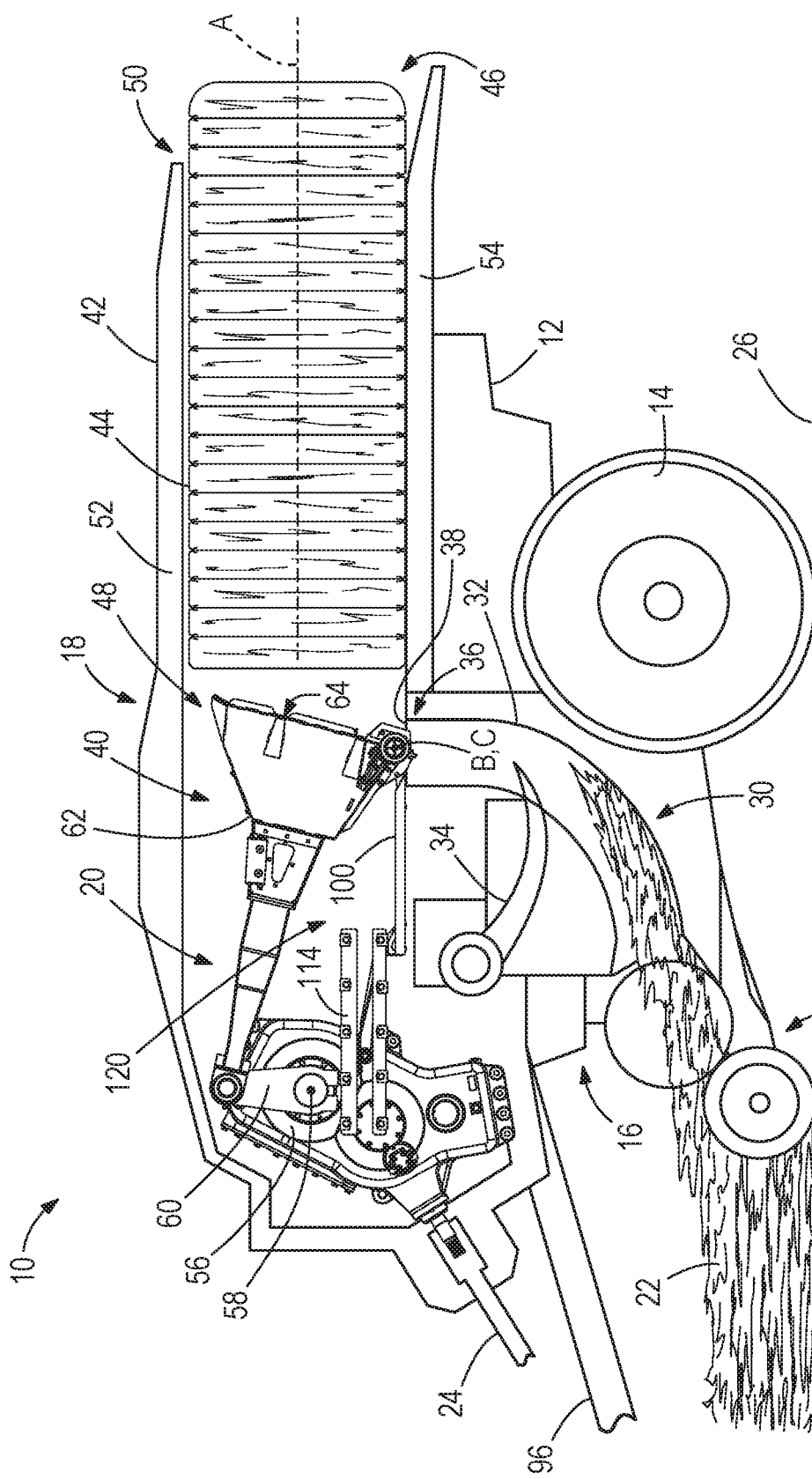
FIG. 1 is a side cutout view of a baler having a feed system, a plunger assembly, and a feed system cap in accordance with one implementation of the present disclosure, the feed system being illustrated schematically.

Referring to FIG. 1, a baler 10 includes a frame 12, a set of wheels 14 mounted on the frame 12, a feed system 16 coupled to the frame 12, a compression system 18 having a plunger assembly 20 to receive and compress crop material 22 provided by the feed system 16. In the illustrated implementation, the baler 10 is a square baler for forming bales of the crop material, such as hay, straw, or other biomasses.

In the illustrated implementation, the baler 10 includes a tow bar 96 extending from the frame 12 and connectable to a towing vehicle (not shown), such as an agricultural tractor or other vehicle (not shown). The baler 10 also includes a power takeoff shaft 24 connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 14 and for driving and/or powering the various components of the baler 10.

Figure 2:
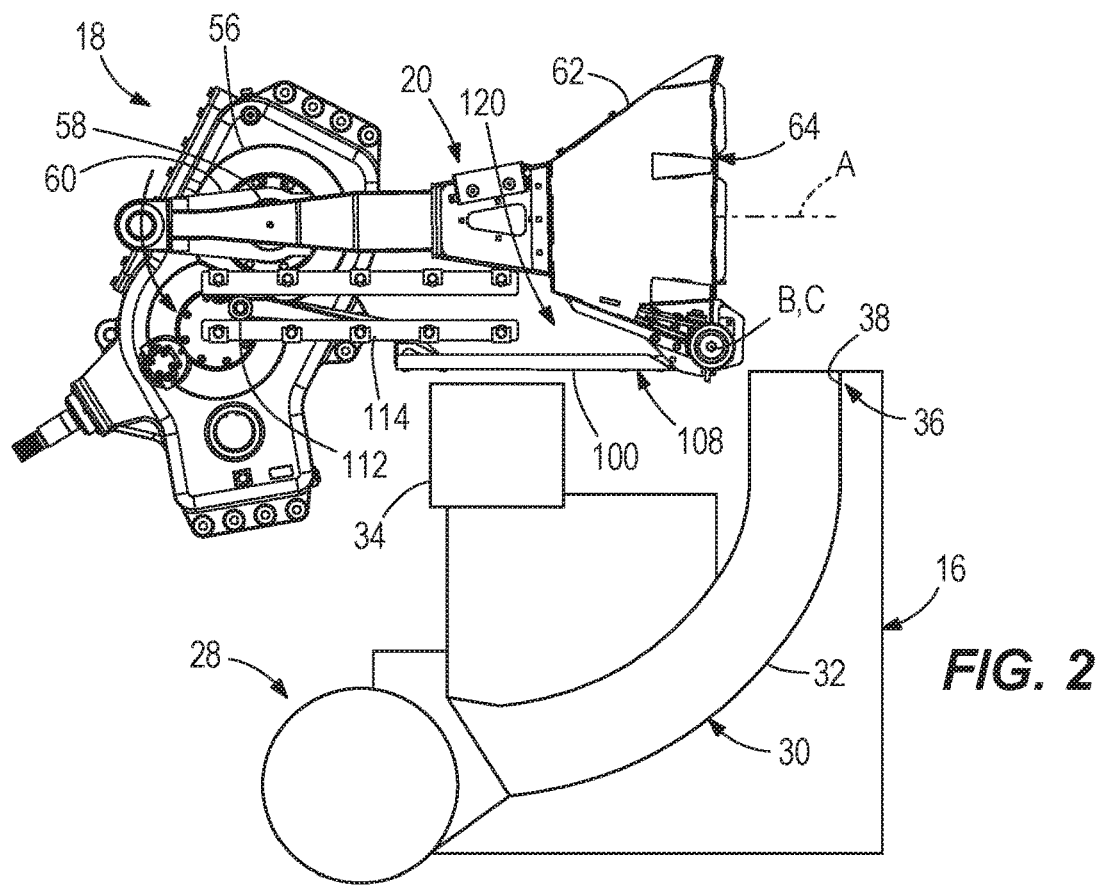
FIGS. 2-5 are side views of the feed system, the plunger assembly, and the feed system cap of the baler of FIG. 1, each figure illustrating a different position of the plunger assembly during a stroke cycle.
Figure 3:
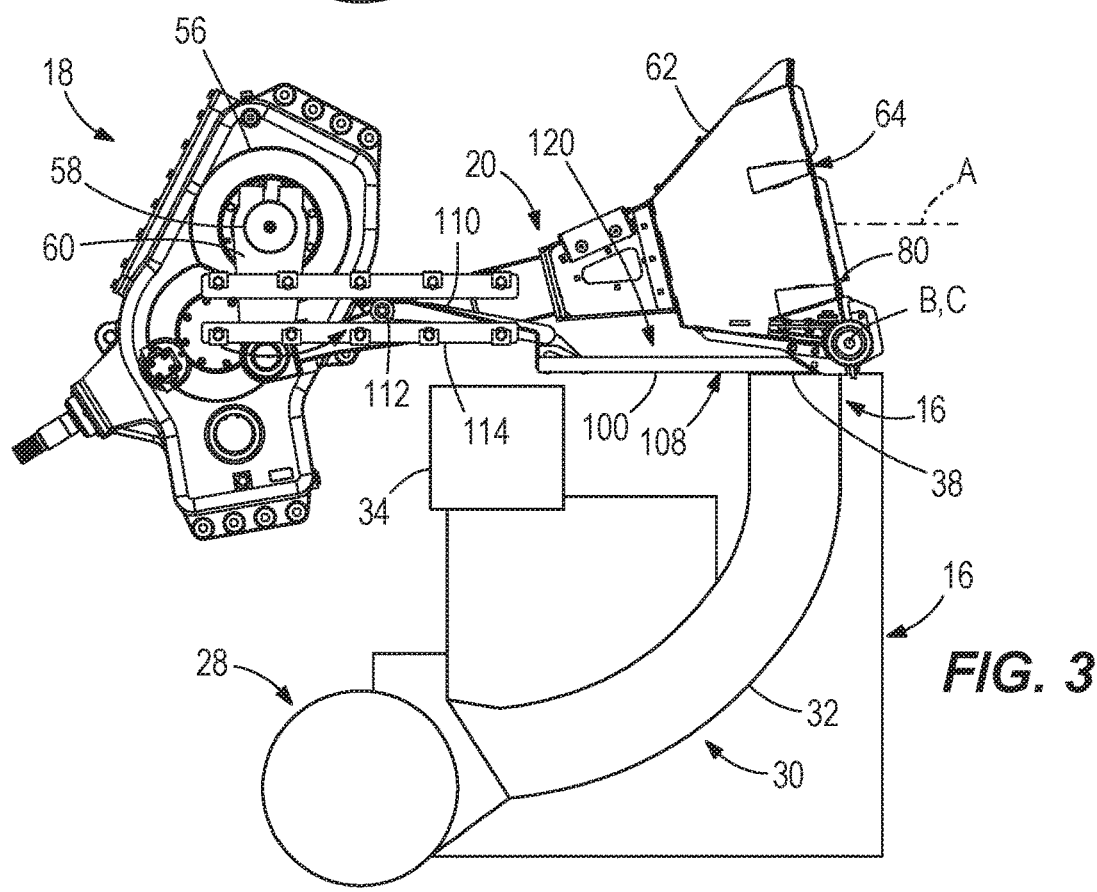

As shown in FIGS. 1 and 2, the feed system 16 of the baler 10 is configured to pick up crop material from a support surface 26 and convey it to the compression system 18. In the illustrated implementation, the feed system 16 includes a pickup assembly 28 for receiving the crop material 22 from the support surface 26, and a delivery assembly 30 for directing the collected crop material to the compression system 18.

The delivery assembly 30 of the feed system 16 directs the crop material 22 collected by the pickup assembly 28 to the compression system 18. In particular, the delivery assembly 30 is configured to direct a metered amount of crop material 22 to the compression system 18 during every stroke cycle (described below) of the plunger assembly 20. In the illustrated implementation, the delivery assembly 30 includes a pre-compression chamber 32 and a fork 34 (FIG. 1), the fork 34 operable feed the crop material 22 from the pickup assembly 28 towards an end 36 (e.g., a top end) of the pre-compression chamber 32 closer to the compression system 18. The fork 34 is also operable to move the crop material 22 from the feed system 16 to the compression system 18 through an opening 38 in the end 36 (e.g., in the top of) of the pre-compression chamber 32.

Figure 4:
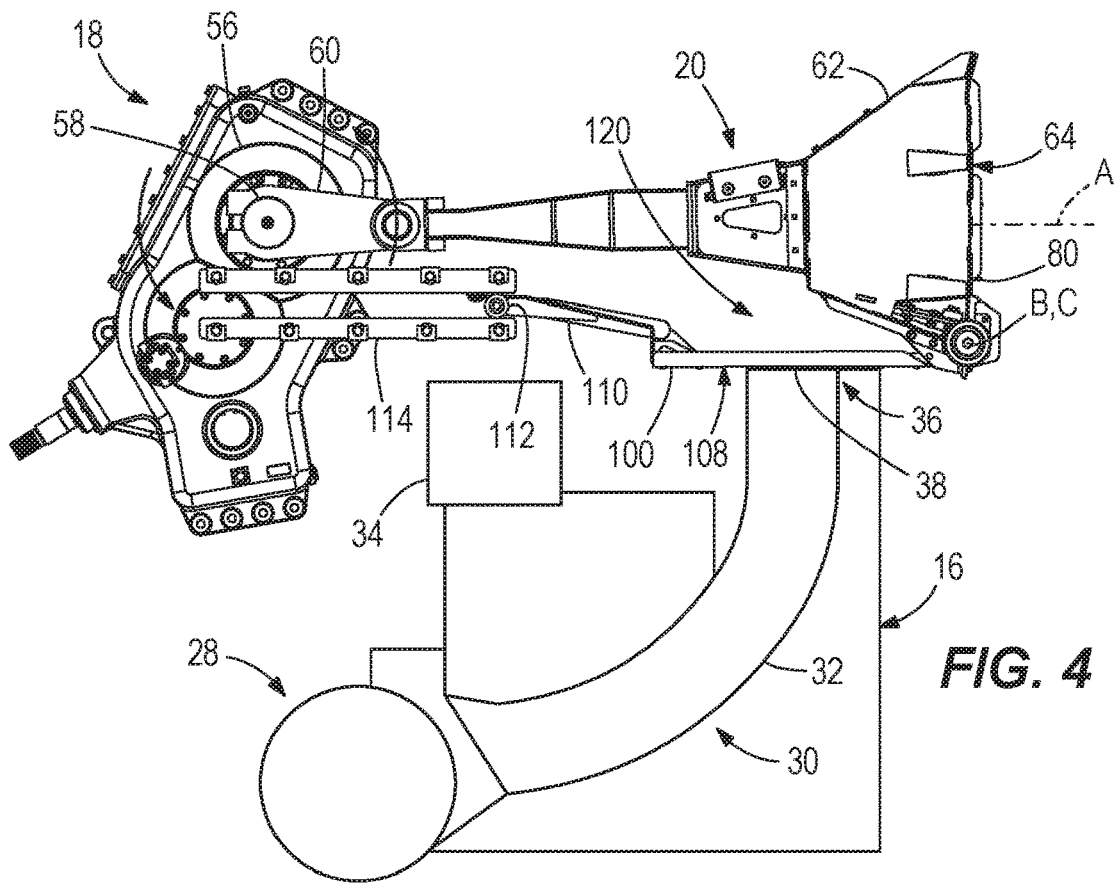
Figure 5:
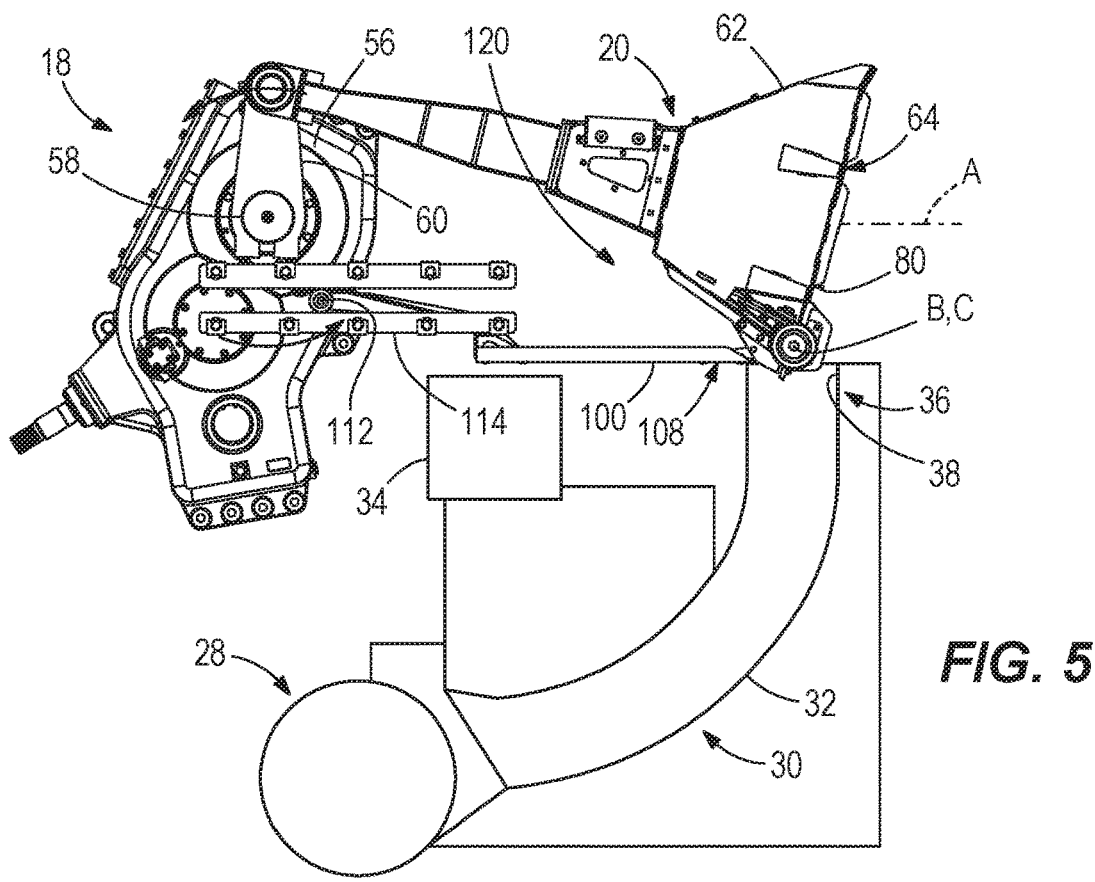

The compression system 18 of the baler 10 includes a baling chamber 40 in communication with the feed system 16, a bale case 42 at least partially defining the baling chamber 40, and the plunger assembly 20 positioned at least partially within the baling chamber 40. A metered amount of the crop material 22 known as a flake is moved into the baling chamber 40 from the feed system 16 whereby the plunger assembly 20 (as shown in FIG. 4) compresses the crop material 22 against already compacted crop material disposed in the bale case, herein referred to as the forming bale 44. The plunger assembly 20 then retracts through the baling chamber 40 (as shown in FIG. 5) as another metered amount of crop material 22 is readied to be moved into the baling chamber 40 by the feed system 16 and the stroke cycle begins again. In each compression stroke portion of the stroke cycle, the compression system 18 compresses the newly introduced crop material against the face of the forming bale 44, causing the forming bale 44 to grow in an extruded fashion into a densely packed cuboid shape within the bale case 42. Once the forming bale 44 achieves the desired size and density, it is bound (e.g., with wire) by knotters (not shown) to form the bale. The freshly created bale subsequently becomes a support surface against which the next forming bale may begin to form and the process is repeated. Once a bale is completely formed, the bale is ejected from a rear 46 of the baler 10 for subsequent collection.

The bale case 42 is substantially rectangular, or cuboid, in shape having a first open end 48 to receive the plunger assembly 20 therein, and a second open end 50, opposite the first open end 48 disposed proximate the rear 46 of the baler 10. The bale case 42 includes an upper wall 52 farthest from the wheels 14, a lower wall 54 closer to the wheels 14 than the upper wall 52 and disposed proximate the feed system 16, and sidewalls (not shown) extending between the upper wall and the lower wall. The bale case 52 also defines a longitudinal extrusion axis A extending along the length of the bale case 52 proximate its center between the walls 52, 54. The bale case 52 acts as a container, holding and extruding the forming bale 44 and one or more completed bales against which the compression system 18 compresses the newly introduced crop material from the feed system 22. While doing so, the bale case 52 applies a compressive or otherwise resistive force against the forming bale 44 and any completed bales to resist motion within the bale case 52 toward the second open end 50.

Referring now to FIGS. 2-5, the plunger assembly 20 of the compression system 18 includes a gearbox 56 having an output shaft 58, a pair of crank arms (one crank arm 60 shown and described, the other being a mirror image thereof) coupled to and rotatable with the output shaft 58, and a plunger 62 movable with respect to the baling chamber 40. In the illustrated implementation, the gearbox 56 receives input from the power takeoff shaft 24. In alternative implementations, the gearbox 56 may be driven by a stand-alone power system, such as an internal combustion engine. The gearbox 56 typically includes a number of gear sets (not shown) to transmit the torque provided by the power takeoff shaft 24 to the output shaft 58 at a given gear ratio. The crank arm 60 is substantially elongated in shape and transfers torque between the output shaft 58 and the plunger 62.

Figure 7:
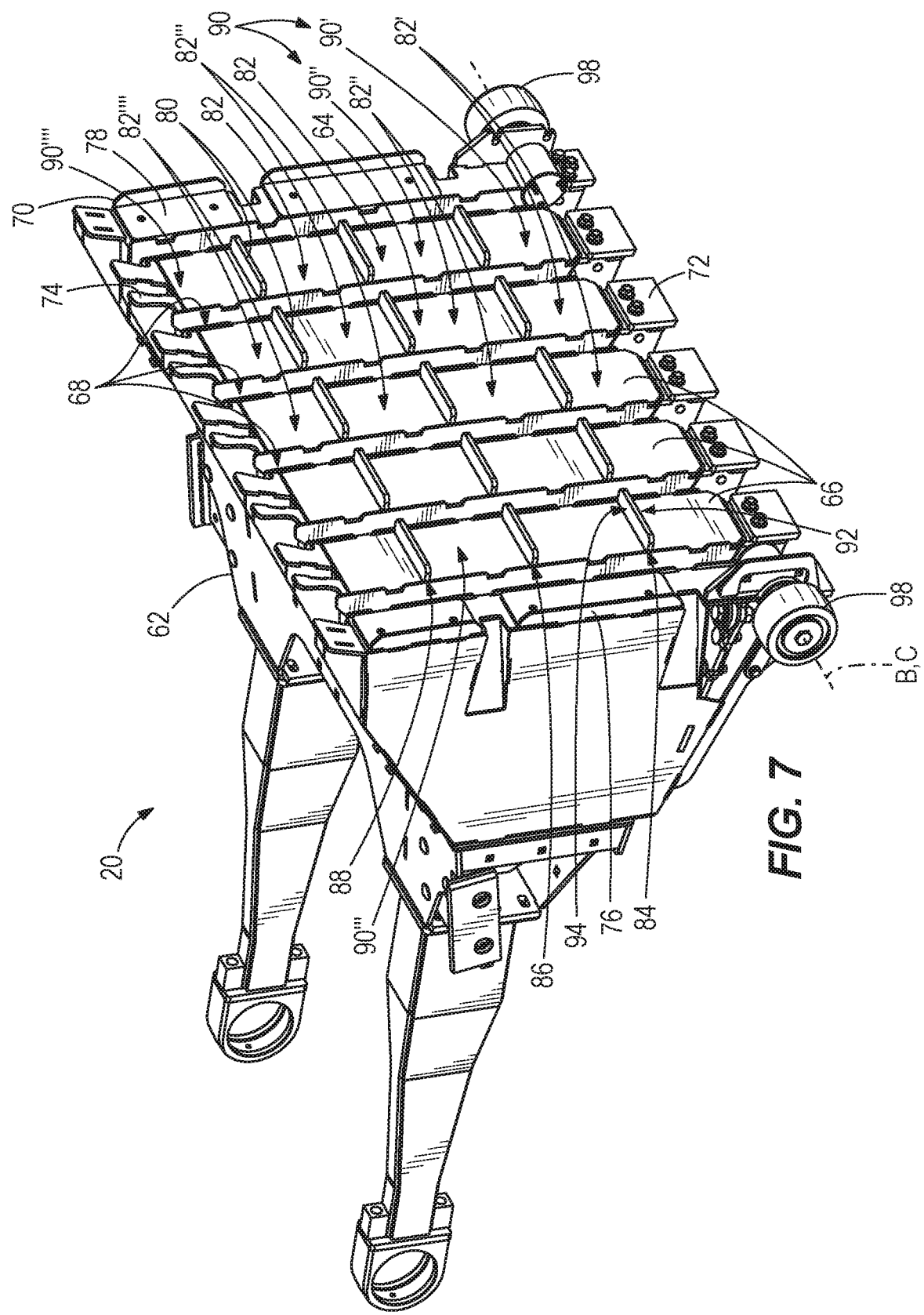
FIG. 7 is a front perspective view of a portion of the plunger assembly of the baler of FIG. 1.

The plunger 62 includes a compression surface, referred to herein as a face 64, that engages and compresses the flake disposed in the baling chamber 40. The face 64 may be formed from one or more surfaces 66, which may be continuous or spaced apart to singularly or collectively form the face 64. As illustrated in FIG. 7, the plurality of surfaces 66 collectively define the face 64. A plurality of gaps 68, which may be in the form of apertures, recesses, slots, or the like, may separate the plurality of surfaces 66 and provide space for knotters (not shown) to tie string or twine around the completed bale. In other implementations, the face 64 may be formed from a continuous surface. The face 64 of the plunger 62 is encircled by an outer periphery 70. In the illustrated construction, the outer periphery 70 includes portions projecting forwardly from the face 64 in the axial direction of the extrusion axis A, towards the forming bale 44. In other implementations, the outer periphery 70 may be recessed from the face 64, may be coplanar with the face 64, or may be continuous with any curvature of the face 64. The outer periphery 70 includes a lower edge 72, an upper edge 74, and first and second side edges 76, 78 extending from the lower edge 72 to the upper edge 74. The upper edge 74 is disposed proximate the upper wall 52 of the bale case 42, which is farthest from the wheels 14. The lower edge 72 is opposite the upper edge 74 and disposed proximate the lower wall 54 of the bale case 42 adjacent the feed system 16, and the lower edge 72 is closer to the wheels 14 than the upper edge 74. The first and second side edges 76, 78 extend between the upper edge 74 and the lower edge 72 on left and right sides, respectively.

In the illustrated implementation, the face 64 of the plunger 62 is substantially planar and is formed from the one or more surfaces 66, which are coplanar. However, in other implementations the face 64 may be convex and/or arcuate and/or curvilinear (not shown) in contour (e.g., semi-cylindrical). In yet other implementations, the face 64 may include any planar or curvilinear shape (not shown). In still other implementations, the face 64 may change in cross-sectional shape along its width as well as along its height (i.e., hemispherical in shape, and the like).

Due to the arrangement of the crank arm 60, the plunger 62 is disposed within and movable with respect to the baling chamber 40 both linearly along the extrusion axis A of the baling chamber 40 and angularly with respect to the extrusion axis A, as illustrated in FIGS. 2-5.

With regards to the linear motion, the plunger 62 translates or moves linearly along the extrusion axis A of the baling chamber 40 between an extended position (see FIG. 4), where the plunger is its furthest distance from the output shaft 58, and a retracted position (see FIG. 2), where the plunger 62 is positioned its closest distance to the output shaft 58.

With regards to the angular motion, the plunger 62 rotates between a first position (see FIG. 3) where the face 64 partially faces the upper wall 52 of the bale case, and a second position (see FIG. 5) where the face 64 partially faces the lower wall 54 of the bale case 42. The plunger 62 generally pivots about a pivot axis B at or near the lower edge 72 of the face 64 during the linear motion described above. Thus, the pivot axis B moves substantially linearly fore and aft during reciprocation of the compression system 18, substantially parallel with the extrusion axis A. However, the pivot axis B need not move in pure linear translation as the lower edge 72 of the plunger face 64 may lift and lower slightly during reciprocation. In other implementations, the pivot axis B may be disposed anywhere on the plunger 62, or outside of the plunger 62. In some implementations, the motion of the plunger may be referred to as a rocking motion, which includes both the linear translation and the angular motion.

In other implementations, the crank arm 60 may be configured for pure linear translation of the plunger 62 along the extrusion axis A.

With reference to FIG. 7, a plurality of crop retainers 80 project from the face 64 and are spaced from the outer periphery 70. The crop retainers 80 project from the face 64, away from the plunger 62, defining a barrier between portions 82 of the face 64. In the illustrated implementation, the crop retainers 80 extend substantially orthogonally from the face 64, or substantially normal to the face 64, which is also substantially parallel with the extrusion axis A. "Substantially" includes "exactly and deviating slightly from exactly", e.g., within 1 degree, within 5 degrees, within 10 degrees, or within 15 degrees. In other implementations, the crop retainers 80 may extend at an angle other than 90 degrees with respect to the face 62, such as between about 75 and about 105 degrees, between about 60 and about 120 degrees, between about 30 and about 150 degrees, or between about 15 and about 165 degrees. "About" should be understood herein to mean+/−5 degrees. In other implementations, a single crop retainer 80 may be employed.

Each of the plurality of crop retainers 80 project up to 4 inches from the face 64, measured normal to the face 64. In the illustrated construction, the crop retainers 80 project about 2 inches from the face (+/− 0.25 inches). However, the crop retainers 80 may project 2 to 3 inches from the face or 2 to 4 inches from the face 80. In other implementations, the crop retainers 80 may project 1-2 inches from the face 64. It should be understood that each crop retainer 80 need not have the same characteristics (e.g., need not project the same distance, extend in the same direction as the others, or have the same size, length, shape, etc.). The crop retainers 80 may each vary within the variety of the characteristics described herein.

In the illustrated implementation, first, second, and third rows 84, 86, 88 of crop retainers 80 are employed. In other implementations, a single row, two rows, four rows, five rows, six rows, or any other suitable number of rows may be employed. In the illustrated implementation, the rows 84, 86, 88 are substantially straight and orthogonal with respect to the outer periphery 70. However, in other constructions, the rows 84, 86, 88 may be staggered, offset, diagonal, or the like. Each row 84, 86, 88 may be formed from a single crop retainer 80 or more than one of the crop retainers 80. Each crop retainer 80, or row 84, 86, 88 of crop retainers 80, defines a barrier between portions 82 of the face 64. For example, the first row 84 (or one of the crop retainers 80 therein) defines a barrier between a first portion 82' of the face 64 and a second portion 82" of the face 64, the second row 86 (or one of the crop retainers 80 therein) defines a barrier between the second portion 82" of the face 64 and a third portion 82'" of the face 64, the third row 88 (or one of the crop retainers 80 therein) defines a barrier between the third portion 82'" of the face 64 and a fourth portion 82"" of the face 64.

Crop retaining areas 90 are defined between each row 84, 86, 88, e.g., between each nearest adjacent pair of crop retainers 80 in a vertical direction (e.g., extending between the upper and lower edges 74, 72 of the plunger 62). The first and last crop retaining areas 90 are defined between a row and the lower or upper edge 72, 74, respectively. Thus, in the illustrated implementation, the three rows 84, 86, 88 of crop retainers 80 define first, second, third, and fourth crop retaining areas 90', 90", 90'", 90''''. As discussed above, other numbers of rows may be employed, which correspondingly varies the number of crop retaining areas 90, as is readily understood. It should also be understood that each crop retainer 80 contributes to defining one of the crop retaining areas 90 on one side 92 of the crop retainer 80 and another of the crop retaining areas 90 on an opposite side 94 of the crop retainer 80. The one side 92 and the opposite side 94 are substantially planar, oppositely facing sides. The crop retaining areas 90 are also bounded at the rear by the face 64 (or more specifically by one of the portions 82 of the face) and may also be bounded on the sides by the first and second side edges 76, 78. The crop retainer(s) 80 provide a barrier configured to inhibit the crop material from moving between different crop retaining areas 90 during the compression stroke, improving consistency of bale density from bottom to top.

In the illustrated implementation, the crop retainers 80 are arranged in parallel to each other, each crop retainer 80 being elongated and extending in a direction along the face 64 substantially perpendicular to the extrusion axis A. In other implementations, the crop retainers 80 need not be arranged in parallel and may be arranged transverse to each other in any suitable configuration or pattern. For example, the crop retainers 80 may be arranged in a zig-zag pattern, such as a chevron pattern, a herringbone pattern, a haphazard alternating pattern, or the like, or in a haphazard pattern.

In the above implementations, the crop retainers 80 extend in a direction between the first and second sides 76, 78 of the plunger 62. The direction may be orthogonal (e.g., horizontal), and may also be diagonal between a lower portion of the first side edge 76 and an upper portion of the second side edge 78, or vice versa. In other implementations, the crop retainers 80 may be arranged vertically, extending orthogonally between the upper edge 74 and the lower edge 72. It should be understood that the crop retainers 80 may be formed together as one piece, e.g., particularly in the implementation having the face 64 formed from the single continuous surface described above, or in other implementations.

Returning to FIGS. 1-6, a feed system cap 100 is hingedly, or pivotally, coupled to the plunger assembly 20 about an articulation axis C, which may include a pair of plunger rollers 98 or bearings (FIG. 6). The articulation axis C is parallel to the pivot axis B and may be coaxial with the pivot axis B of the plunger 62 or may be slightly offset therefrom, with both axes B and C being near the face 64. In other implementations, the articulation axis C and the pivot axis B may be spaced apart. The feed system cap 100 generally follows the plunger assembly 20 during reciprocation, albeit with freedom to pivot relative thereto. The articulation axis C is generally perpendicular to the extrusion axis A.

In the illustrated implementation, the feed system cap 100 is pivotally coupled to the plunger 62 for angular movement with respect to the plunger 62, and more specifically is coupled to the plunger 62 proximate the face 64, and more specifically proximate the lower edge 72 of the face 64. The articulation axis C is substantially parallel with the face 64. In other implementations the feed system cap 100 may be coupled to other components of the plunger assembly 20, such as the crank arm 60, or to the output shaft 58, e.g., by way of another linkage or any suitable means. Thus, the feed system cap 100 is configured to reciprocate with the compression assembly 18 and is also moveable (e.g., pivotable) about the articulation axis C with respect to the compression assembly 18.

The feed system cap 100 is generally disposed between the feed system 16 and the plunger 62 to inhibit flow of the crop material from the feed system 16 to the baling chamber 40 during the compression stroke, more specifically inhibiting the flow of crop material from the feed system 16 into an area 120 behind the plunger 62 (e.g., between the plunger face 64 and the output shaft 58). The feed system 16 includes the opening 38 to the baling chamber 40 through which the crop material passes from the feed system 16 to the baling chamber 40. The feed system cap 100 is configured to open and close the opening 38. Open (FIG. 2) is when the feed system 16 is in communication with the baling chamber 40 such that the flake of crop material can move from the feed system 16 (e.g., from the pre-compression chamber 32) to the baling chamber 40. In the open position, the plunger 62 is in or near its retracted position (FIG. 2) such that the face 64 is in or near its closest position to the output shaft 58 in the stroke cycle. Closed is when the feed system cap 100 generally inhibits flow of crop material from the feed system 16 (e.g., from the pre-compression chamber 32) into the baling chamber 40 while the plunger 62 is in the compression stroke, e.g., by being disposed generally between the pre-compression chamber 32 and the baling chamber 40. In the closed position, the plunger 62 is in or near its extended position (FIGS. 3 and 4) such that the face 64 is in or near its farthest position from the output shaft 58 in the stroke cycle. The feed system cap 100 need not form an air-tight seal and in fact includes a plurality of bars 102 having gaps 104 therebetween, the gaps 104 accommodating the knotters (not shown). Each of the bars 102 has a lower surface 106, the lower surfaces 106 collectively defining a capping surface 108 facing the opening 38 of the pre-compression chamber 32. The capping surface 108 may be substantially planar, as illustrated, or may be staggered, curved, or have any other suitable configuration. The feed system cap 100 may also be spaced slightly from or engaged with the top end 36 of the pre-compression chamber 32 forming the opening 38 in the feed system 16.

Figure 6:
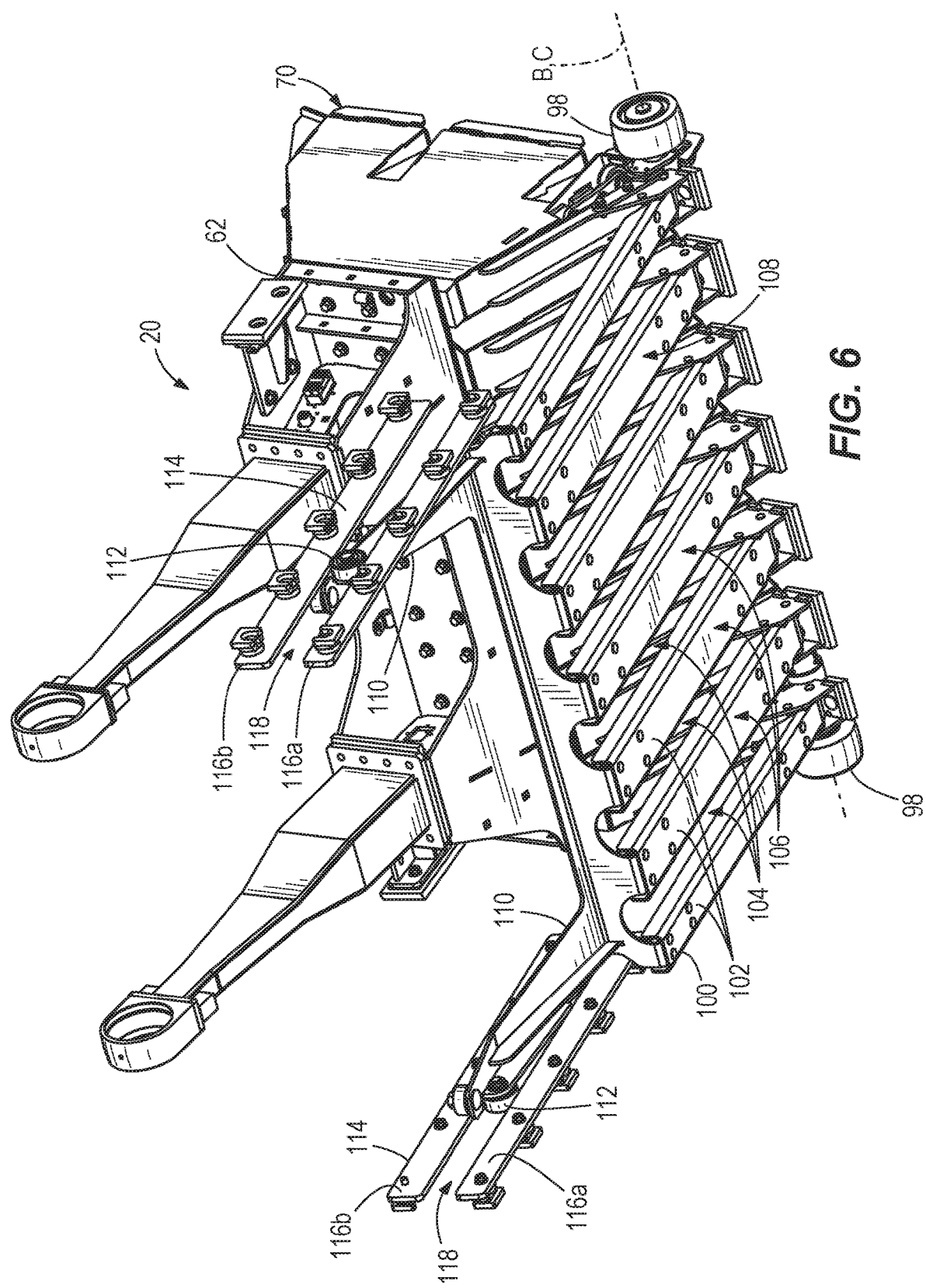
FIG. 6 is a rear perspective view of a portion of the plunger assembly and the feed system cap of the baler of FIG. 1.

A roller arm 110 is fixed to and extends from the feed system cap 100. In other implementations, the roller arm 110 may be movably coupled to the feed system cap 110, e.g., in an articulating fashion. It should be understood that two roller arms 110 are employed, as shown in FIG. 6, but only one of the roller arms 110 need be discussed herein as the other is a mirror image thereof and labeled with the same reference numerals. The roller arm 110 is generally elongated extending away from the feed system cap 100 and includes a roller 112 coupled thereto, which may be rotatably coupled thereto. In other implementations, the roller 112 may be fixedly coupled to the roller arm 110 to act as a bearing. The roller 112 may be disposed at a distal end of the roller arm 110, as illustrated, or at any other location on the roller arm 110. In other implementations, the roller 112 may be coupled directly to the feed system cap 100.

A track 114 for receiving the roller 112 is disposed at least partially in or near the baling chamber 40. It should be understood that two tracks 114 are employed to correspond with the two rollers 112, as shown in FIG. 6, but only one of the tracks 114 need be discussed herein as the other is a mirror image thereof and labeled with the same reference numerals. The track 114 is fixed with respect to the frame 12 and does not move with the compression system 18. In the illustrated implementation, the track 114 is substantially linear, extending substantially parallel to the extrusion axis A. The track 114 includes first and second track members 116a, 116b defining a channel 118 therebetween. The roller 112 is received in the channel 118, the roller 112 moveable fore and aft along the linear track 114. In other implementations, the track 114 may define the channel 118 with any number of track members, such as one, three, or more. In yet other implementations, one, three, four, or more tracks 114 may be employed, e.g., to correspond with the number of rollers 112 employed with the feed system cap 100.

The feed system cap 100 may move fore and aft substantially linearly as the plunger 62 reciprocates, and/or may oscillate (e.g., deviate a small amount from pure linear translation, such as from 1 to 30 degrees, from 1 to 20 degrees, from 1 to 15 degrees, from 1 to 10 degrees, from 1 to 5 degrees, etc., above or below the extrusion axis A) as the plunger 62 reciprocates. Other angles are possible. For example, when the articulation axis C (the pivotal connection of the feed system cap 100 to the plunger 62) is offset from the pivot axis B of the plunger 62, the feed system cap 100 has a first motion aligned with the extrusion axis A and a second motion that is not aligned with the extrusion axis A. This offset causes the feed system cap 100 to move horizontally (along the extrusion axis A) and vertically (perpendicular to the extrusion axis A) as the plunger 62 extends and retracts. Thus, the feed system cap 100 has a first cap motion aligned with the extrusion axis A and a second cap motion that is not aligned with the extrusion axis A. In other implementations, such as when the articulation axis C coincides with the pivot axis B of the plunger 62, the feed system cap 100 has only the first cap motion aligned with the extrusion axis A and no second cap motion, e.g., being in substantially linear translation fore and aft.

Figure 8:
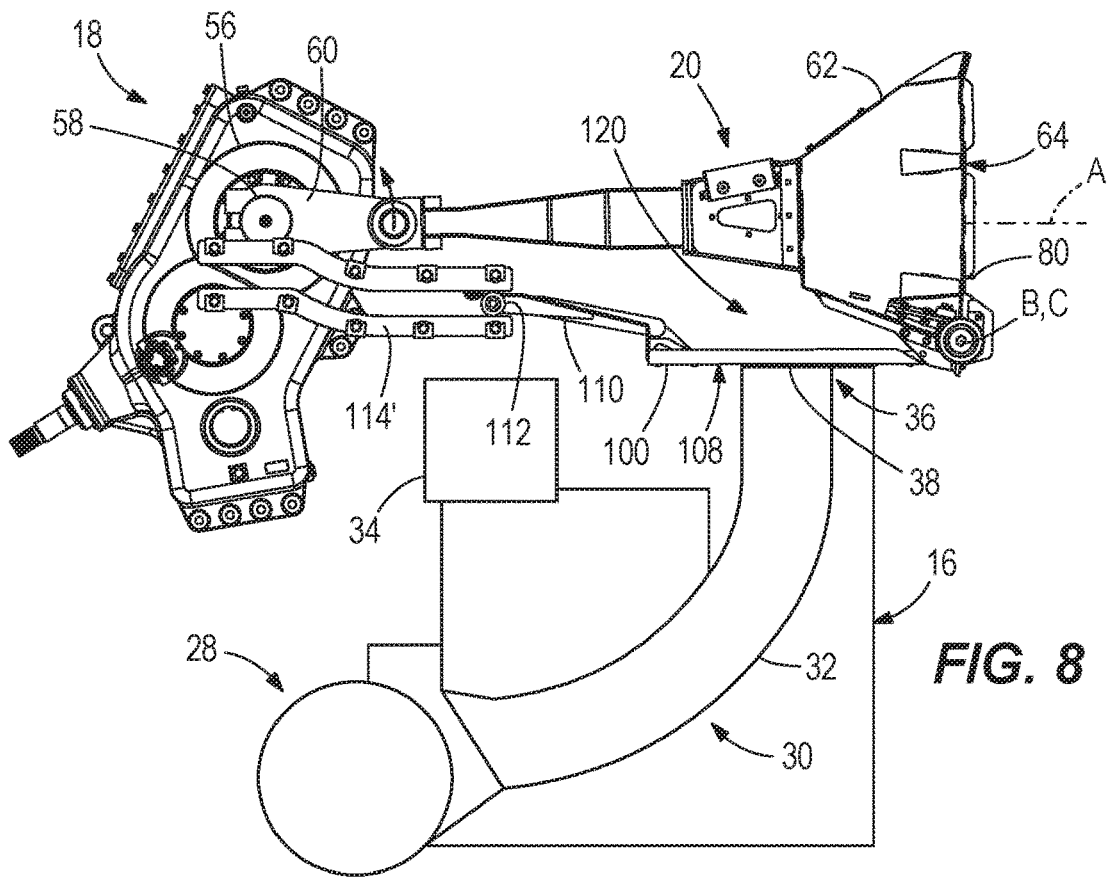
FIGS. 8-9 are side views of the feed system, the plunger assembly, and the feed system cap of the baler of FIG. 1 illustrating alternative track arrangements.
Figure 9:
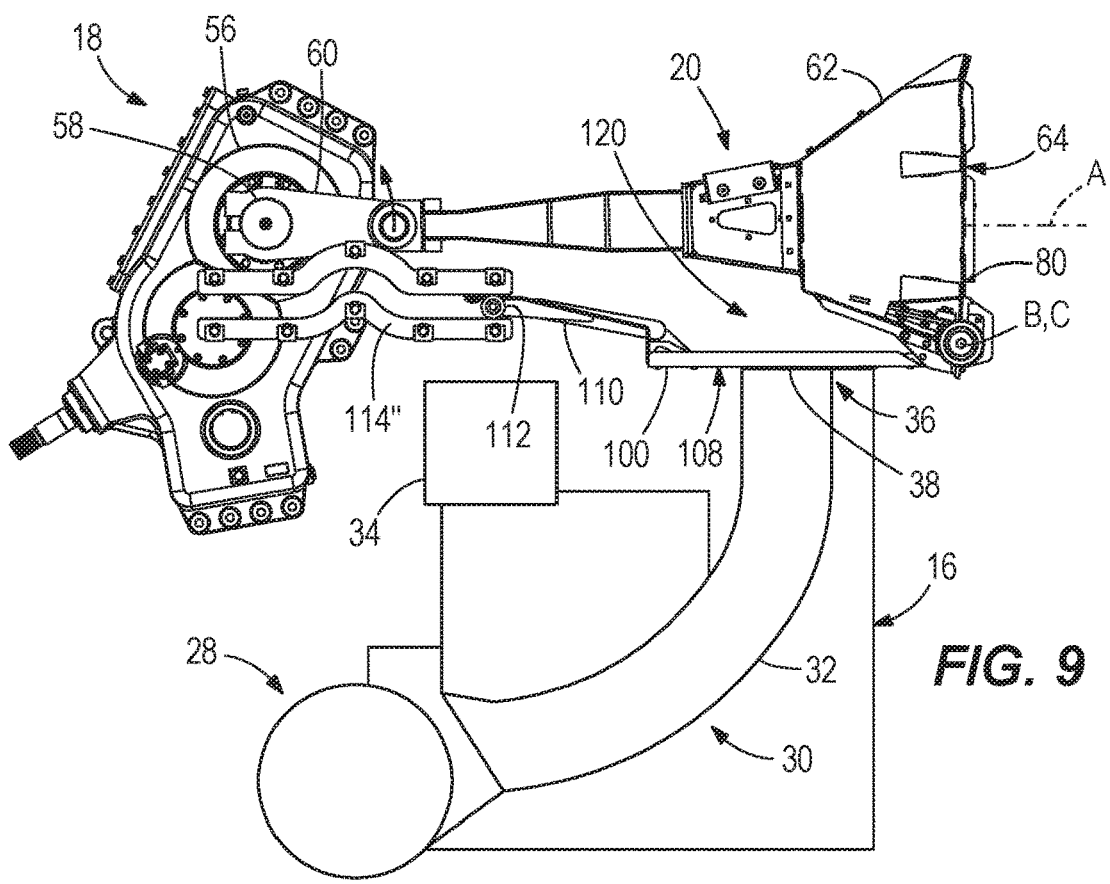

FIGS. 8-9 illustrate alternative tracks 114',114" with the remaining features of the baler 10 in FIGS. 8-9 being the same as described above. As shown in FIGS. 8-9, the tracks 114',114" may be non-linear to impart an angular motion on the feed system cap 100, e.g., to impart the second cap motion that is not aligned with the extrusion axis A. This may be separate or in addition to the angular motion (e.g., the second cap motion) that may be imparted on the feed system cap 100 by having the articulation axis C offset from the pivot axis B as described above. When the tracks 114',114" are non-linear, this causes the feed system cap 100 to have the first cap motion (linear motion component) and the second cap motion (angular motion component). The geometry of the non-linear tracks 114' can be designed to achieve the desired second cap motion, e.g., the desired oscillation angle of the feed system cap 100 with respect to the extrusion axis A. For example, FIG. 8 illustrates tracks 114' having an S-shaped, or angled, configuration, where the tracks 114' raise and lower the height of the roller 112 during reciprocation. As the plunger 62 retracts (moves closer to the output shaft 58), the roller 112 will rise and, in turn, raise the roller arm 110 and the feed system cap 100 to an elevated angle with respect to the extrusion axis A, and will lower the feed system cap 100 returning to parallel with the extrusion axis A as the plunger 62 extends away from the output shaft 58. FIG. 9 illustrates tracks 114" having a peak between two substantially linear sections, where the tracks 114" raise and lower the height of the roller 112 during each reciprocation stroke. As the plunger 62 retracts (moves closer to the output shaft 58), the roller 112 will elevate in the peak to raise the roller arm 110 and the feed system cap 100 to an elevated angle with respect to the extrusion axis A and will then return to the horizontal orientation parallel to the extrusion axis A towards the end of the retraction stroke. As the plunger 62 extends away from the output shaft 58, the feed system cap 100 will again briefly increase in angle with respect to the extrusion axis A and then lower as the roller 112 moves through the peak, returning to parallel with the extrusion axis A towards the end of the extension stroke. Other non-linear geometries are possible and can be designed to achieve the desired second cap motion. The changing track height of such non-linear configurations of the tracks 114',114" directly affects the angle of the feed system cap 100. The changing angle of the feed system cap 100 (e.g., the second cap motion) is configured to facilitate a reduction in the amount of crop inadvertently transferred from the pre-compression chamber 32 to the baling chamber 40, e.g., being dragged into the area 120 behind the plunger 62 by movement of the feed system cap 100.

As described above, a first portion of the plunger motion (which may be referred to herein as a first plunger motion) is aligned with the extrusion axis A and a second portion of the plunger motion (which may be referred to herein as a second plunger motion) is not aligned with the extrusion axis A. Also as described above, the plunger 62 is configured to move linearly and pivot angularly at the same time, in reciprocation. The plunger 62 pulls the feed system cap 100 in reciprocating motion as a result of the coupling therebetween (described above). Due to the coupling between the feed system cap 100 and the plunger 62, the first cap motion (which is aligned with the extrusion axis A) is synchronized with the first plunger motion (which is aligned with the extrusion axis A) such that when the plunger 62 advances or retracts along the extrusion axis A, the feed system cap 100 also advances or retracts along the extrusion axis A by the same amount (measured purely with respect to a linear direction of the extrusion axis A). With regards to angular motion of the plunger 62 and the feed system cap 100 (e.g., the second plunger motion and the second cap motion, respectively), the respective angular motions need not be synchronized as the feed system cap 100 is free to pivot at a different angle than the angle at which the plunger 62 pivots due to the pivotal connection therebetween.

Other aspects of the compression system are described in U.S. patent application Ser. No. 15/292,008, filed on Oct. 12, 2016, the entire contents of which are incorporated by reference herein.

In operation, the plunger 62 is configured to compress crop material located within the baling chamber 40 and positioned between the face 62 of the plunger 64 and the forming bale 44 during the baling process. In particular, the plunger 62 stroke cycle includes the compression stroke from the retracted position (see FIG. 2), with the face 64 substantially normal to the extrusion axis A of the baling chamber 40, and with a metered amount of crop material or flake just moved through the opening 38 from the feed system 16 into the baling chamber 40, e.g., by the fork 34. The plunger 62 then begins moving along the extrusion axis A toward the extended position (and toward the rear 46 of the bale case 40) while simultaneously rotating about the pivot axis B, e.g., in a counter-clockwise direction (with respect to FIGS. 2-3). The feed system cap 100 follows the plunger 62 along the extrusion axis A with the rollers 112 following the tracks 114. As the plunger 62 rotates, or tilts, the feed system cap 100 is free to articulate with respect to the plunger 62, thus allowing the feed system cap 100 to remain in substantially linear translation, or to oscillate slightly if desired, while covering the opening 38 of the feed system 16.

As the crop material is captured between the face 64 of the plunger 62 and the forming bale 44, the plunger 62 continues to move toward the extended position (FIG. 4) thereby compressing the crop material into the forming bale 44. During the compression process, the face 64 may be disposed at an angle while rotating towards its extended position normal to the extrusion axis A. During this portion of the compression stroke, the crop retainers 80 inhibit flow of the crop material between strata defined by the crop retainers 80, as discussed above. For example, the crop retainers 80 inhibit flow of crop material upwards within the baling chamber 40 (from the first crop retaining area 90' to the second crop retaining area 90'', from the second crop retaining area 90'' to the third crop retaining area 90''', and from the third crop retaining area 90'''' to the fourth crop retaining area 90'''') thus facilitating evenness of the crop density from bottom to top of each finished or forming bale 44.

After undergoing the compression stroke, the plunger 62 begins a retraction stroke of the stroke cycle, returning back to the retracted position (see FIGS. 4-5 and then FIG. 2) eventually disengaging from the forming bale 44 and moving in an opposite direction along the extrusion axis A away from the rear 46 of the bale case 40. The plunger 62 beings to rotate about the pivot axis B in a clockwise direction (see FIGS. 4-5). Once the plunger 62 has returned to its initial retracted position (FIG. 2), the feed system 16 may position a second metered amount of crop material within the baling chamber 40 and the stroke cycle begins anew.

Thus, the disclosure provides a feed system cap 100 for inhibiting flow of crop material from the feed system 16 to the compression system 18, specifically behind the plunger 62, during the compression stroke. The disclosure also provides crop retainers 80 for inhibiting flow of crop material vertically between strata during the compression stroke, facilitating evenness of bale density. Various features of the disclosure are set forth in the following claims.

What is claimed is:

1. A baler comprising:
   a frame;
   at least one wheel coupled to the frame proximate a bottom of the frame, the at least one wheel configured to provide traction on a support surface;
   a feed system coupled to the frame;
   a baling chamber for receiving crop from the feed system, the baling chamber defining an extrusion axis therethrough;
   a plunger assembly having a plunger configured for reciprocally compressing the crop, the plunger being at least partially positioned within and movable with respect to the baling chamber, the plunger having at least a first plunger motion aligned with the extrusion axis, wherein the plunger defines a bottom half and a top half, the bottom half closer to the at least one wheel than is the top half; and
   a feed system cap pivotably coupled to the bottom half of the plunger and having at least a first cap motion aligned with the extrusion axis;
   wherein during operation the first cap motion is synchronized with the first plunger motion, and at least one of the plunger and the feed system cap has a second motion that is not aligned with the extrusion axis.

2. The baler of claim 1, wherein the feed system cap is generally disposed between the feed system and the plunger to inhibit flow of the crop from the feed system to the baling chamber during a compression stroke, wherein the feed system cap is disposed above the feed system and below the plunger.

3. The baler of claim 1, wherein the feed system includes an opening disposed in an upper region of the feed system, wherein the upper region is defined in a direction away from the support surface, through which the crop passes from the feed system to a bottom of the baling chamber, wherein the bottom of the baling chamber is defined in a direction towards the support surface, and wherein the feed system cap is configured to open and close the opening.

4. The baler of claim 1, wherein the plunger assembly further includes a crank arm linkage coupled directly to the plunger, wherein the plunger includes a face for engaging and compressing the crop, wherein the feed system cap is pivotally coupled to the plunger at a location defining an articulation axis, wherein the articulation axis is disposed closer to the face than to the crank arm linkage.

5. The baler of claim 1, wherein the feed system cap is pivotable about an articulation axis for movement with respect to the plunger, wherein the articulation axis is generally perpendicular to the extrusion axis.

6. The baler of claim 1, further comprising:
a fixed track; and
a roller arm coupled to the feed system cap, the roller arm having a roller coupled thereto, the roller disposed on the fixed track for fore and aft movement relative to the fixed track.

7. The baler of claim 6, wherein the fixed track is non-linear.

8. The baler of claim 1, wherein the feed system includes a pre-compression chamber and a fork, wherein the fork is configured to raise the crop into the baling chamber against gravity.

9. A baler comprising:
a frame;
a feed system coupled to the frame;
a baling chamber disposed at least partially above the feed system and configured for receiving crop from the feed system, wherein the feed system is configured to raise the crop directly into the baling chamber above against gravity such that the baling chamber is configured to receive the crop from below; the baling chamber defining an extrusion axis therethrough;
a plunger assembly for compressing the crop, the plunger assembly having a plunger at least partially positioned within and movable with respect to the baling chamber; and
a feed system cap pivotally coupled to the plunger assembly, the feed system cap having a roller moveable along a fixed track;
wherein in operation the plunger is configured to present a first plunger motion aligned with the extrusion axis and a second plunger motion not aligned with the extrusion axis, wherein the second plunger motion proceeds about a pivot axis, and wherein the feed system cap is pivotally coupled to the plunger assembly about an articulation axis coincident with the pivot axis.

10. The baler of claim 9, wherein the feed system cap includes a roller moveable along a non-linear fixed track.

11. The baler of claim 9, wherein the feed system cap is generally disposed above an opening in a top of the feed system and below the plunger assembly to inhibit flow of the crop from the feed system to the baling chamber during a compression stroke.

12. The baler of claim 9, wherein the plunger assembly further includes a crank arm linkage coupled directly to the plunger, wherein the plunger includes a face for engaging and compressing the crop, wherein the feed system cap is pivotally coupled to the plunger at a location defining the articulation axis, wherein the articulation axis is disposed closer to the face than to the crank arm linkage.

13. The baler of claim 9, wherein the articulation axis is generally perpendicular to the extrusion axis.

\* \* \* \* \*